(12) United States Patent
Ebina et al.

(10) Patent No.: US 10,487,941 B2
(45) Date of Patent: Nov. 26, 2019

(54) STROKE SENSOR AND SADDLE RIDING TYPE VEHICLE

(71) Applicants: NIPPON SEIKI CO., LTD., Nagaoka-shi, Niigata (JP); HONDA MOTOR CO., LTD., Tokyo (JP)

(72) Inventors: Kota Ebina, Nagaoka (JP); Tomoyuki Tanaka, Nagaoka (JP); Norifumi Shimizu, Fujimi (JP); Jun Morimoto, Tokyo (JP)

(73) Assignees: NIPPON SEIKI CO., LTD., Nagaoka-Shi (JP); HONDA MOTOR CO., LTD., Tokyo (JP)

( * ) Notice: Subject to any disclaimer, the term of this patent is extended or adjusted under 35 U.S.C. 154(b) by 124 days.

(21) Appl. No.: 15/629,131

(22) Filed: Jun. 21, 2017

(65) Prior Publication Data
US 2018/0003299 A1 Jan. 4, 2018

(30) Foreign Application Priority Data
Jun. 30, 2016 (JP) .................. 2016-130214

(51) Int. Cl.
| | | |
|---|---|---|
| *F16H 63/30* | (2006.01) | |
| *F16H 61/28* | (2006.01) | |
| *B60G 17/018* | (2006.01) | |
| *G01D 5/14* | (2006.01) | |
| *G01D 11/24* | (2006.01) | |

(52) U.S. Cl.
CPC ......... *F16H 63/30* (2013.01); *F16H 61/2807* (2013.01); *G01D 5/145* (2013.01); *G01D 11/245* (2013.01); *B60G 17/018* (2013.01); *F16H 2063/3089* (2013.01)

(58) Field of Classification Search
None
See application file for complete search history.

(56) References Cited

U.S. PATENT DOCUMENTS

| | | | | |
|---|---|---|---|---|
| 7,458,586 | B2 * | 12/2008 | Salameh | .............. F16J 15/3224 |
| | | | | 123/198 E |
| 8,365,856 | B2 * | 2/2013 | Kashiwai | ................ F16H 63/30 |
| | | | | 180/230 |

(Continued)

FOREIGN PATENT DOCUMENTS

| | | |
|---|---|---|
| CN | 1132156 A | 10/1996 |
| CN | 1457402 A | 11/2003 |

(Continued)

OTHER PUBLICATIONS

European Search Report dated Nov. 24, 2017, 9 pages.

(Continued)

*Primary Examiner* — Todd M Melton
(74) *Attorney, Agent, or Firm* — Rankin, Hill & Clark LLP

(57) ABSTRACT

A stroke sensor includes a cover that covers a slide end on a protrusion side of a shaft in a slide region between the shaft and a housing while allowing a relative movement between the shaft and the housing, wherein a flange surface the extends radially outward from the slide end is provided on the housing, an axial direction seal that is in close contact with the flange surface in the axial line direction is provided on the cover, and a fixation member that presses the axial direction seal to be in contact with the flange surface is further provided.

11 Claims, 13 Drawing Sheets

(56) References Cited

U.S. PATENT DOCUMENTS

2003/0102635 A1    6/2003    Akita et al.
2006/0208724 A1    9/2006    Reichert et al.

FOREIGN PATENT DOCUMENTS

| | | |
|---|---|---|
| DE | 102005007561 | 8/2006 |
| EP | 2107278 | 10/2009 |
| JP | 52-062750 | 2/1977 |
| JP | 55-092961 | 6/1980 |
| JP | 58-006401 | 1/1983 |
| JP | S60-73126 | 4/1985 |
| JP | 07-022161 | 4/1995 |
| JP | 09-242775 | 9/1997 |
| JP | 2009-247109 | 10/2009 |
| JP | 2009-250307 | 10/2009 |

OTHER PUBLICATIONS

Chinese Office Action with partial English translation dated Sep. 20, 2018, 9 pages.
Chinese Office Action dated May 23, 2019, 7 pages.
Japanese Office Action dated Oct. 1, 2019, Application No. 2016-130214, English translation included, 7 pages.

\* cited by examiner

STROKE SENSOR AND SADDLE RIDING TYPE VEHICLE

CROSS-REFERENCE TO RELATED APPLICATION

Priority is claimed on Japanese Patent Application No. 2016-130214, filed on Jun. 30, 2016, the contents of which are incorporated herein by reference.

BACKGROUND

Field of the Invention

The present invention relates to a stroke sensor and a saddle riding type vehicle.

Background

In the related art, for example, a stroke sensor is disclosed in Japanese Unexamined Patent Application, First Publication No. 2009-250307. In the technique, the stroke sensor is provided on a lost motion mechanism. The lost motion mechanism includes a pull rod that is movably inserted in a case, a push-pull rod that is connected to the pull rod so as to protrude outside of the case, and a rubber boot that covers a portion between the case and part of the push-pull rod on the pull rod side. An end part on the case side of the rubber boot is in close contact with an inner circumferential surface of the case in a radial direction, and thereby, the case is sealed.

SUMMARY

However, a sealing property between the rubber boot and the case depends on a press force that works on the inner circumferential surface of the case by an elastic force of the rubber boot. Therefore, when the case is expanded or the elastic force of the rubber boot is reduced due to the degradation of the rubber boot, the sealing property may be degraded.

An object of an aspect of the present invention is to ensure a sealing property in a stroke sensor and a saddle riding type vehicle that include a cover which covers a slide end on a protrusion side of a shaft in a slide region between the shaft and a housing while allowing a relative movement between the shaft and the housing.

(1) A stroke sensor according to an aspect of the present invention includes: a shaft that extends in a direction along an axial line; a housing that extends along the shaft, houses the shaft in a state where the shaft protrudes outside, and supports the shaft slidably in the direction along the axial line; a detection part that detects a slide amount of the shaft; and a cover that covers a slide end on a protrusion side of the shaft in a slide region between the shaft and the housing while allowing a relative movement between the shaft and the housing, wherein a flange surface the extends radially outward from the slide end is provided on the housing, an axial direction seal that is in close contact with the flange surface in the direction along the axial line is provided on the cover, and a fixation member that presses the axial direction seal to be in contact with the flange surface is further provided.

(2) In the above stroke sensor, a radial direction seal that is in close contact with the shaft in a radial direction may be provided on the cover.

(3) In the above stroke sensor, a protrusion wall that protrudes outward in the direction along the axial line from an outer circumferential part of the flange surface may be provided on the housing, and the fixation member may have a bowl shape and include a circumferential wall that is fitted to the protrusion wall and a bottom wall that continues to the circumferential wall and that presses the axial direction seal to be in contact with the flange surface.

(4) In the above stroke sensor, an elastic protrusion part that protrudes toward the flange surface or the fixation member may be provided on the axial direction seal.

(5) In the above stroke sensor, a recess part to which the elastic protrusion part is fitted may be provided on the flange surface or the fixation member.

(6) In the above stroke sensor, the elastic protrusion part may have an annular shape so as to surround the slide end when seen from the direction along the axial line.

(7) In the above stroke sensor, a rib that protrudes radially outward so as to be in close contact with the cover may be provided on the shaft.

(8) In the above stroke sensor, a bending/stretching part that is capable of being bent and stretched when the shaft is slid may be provided on the cover.

(9) In the above stroke sensor, the bending/stretching part may include one folding part.

(10) In the above stroke sensor, the bending/stretching part may include a plurality of folding parts that are aligned in the direction along the axial line.

(11) In the above stroke sensor, the cover may include an internal pressure adjusting part that adjusts an internal pressure by expanding or shrinking such that a volume of a space between the cover and the shaft is not changed when the bending/stretching part is bent or stretched in accordance with sliding of the shaft.

(12) A saddle riding type vehicle according to another aspect of the present invention includes the above stroke sensor.

According to the above configuration (1), the flange surface that extends radially outward from the slide end is provided on the housing, the axial direction seal that is in close contact with the flange surface in the direction along the axial line is provided on the cover, and the fixation member that presses the axial direction seal to be in contact with the flange surface is further provided. Thereby, the press contact force of the fixation member causes the axial direction seal to be in close contact with the flange surface, and therefore, it is possible to cause the axial direction seal to be sufficiently close contact with the flange surface. That is, even when the housing is expanded or the elastic force of the cover is reduced due to the degradation of the cover, the sealing property between the axial direction seal and the flange surface depends on the press contact force of the fixation member, and therefore, it is possible to cause the axial direction seal to be sufficiently close contact with the flange surface. Accordingly, it is possible to ensure the sealing property.

According to the above configuration (2), the radial direction seal that is in close contact with the shaft in a radial direction is provided on the cover. Thereby, it is possible to ensure the sealing property between the radial direction seal and the shaft in addition to ensuring the sealing property between the axial direction seal and the flange surface. Accordingly, it is possible to reliably prevent water that flows on the shaft or an outer wall of the housing from entering the housing.

According to the above configuration (3), a protrusion wall that protrudes outward in the direction along the axial line from an outer circumferential part of the flange surface is provided on the housing, and the fixation member has a bowl shape and includes a circumferential wall that is fitted to the protrusion wall and a bottom wall that continues to the circumferential wall and that presses the axial direction seal to be in contact with the flange surface. Thereby, it is possible to ensure the sealing property between the axial direction seal and the flange surface by the press contact force of the bottom wall while ensuring the sealing property between the circumferential wall and the protrusion wall by the fitting of the circumferential wall to the protrusion wall.

According to the above configuration (4), an elastic protrusion part that protrudes toward the flange surface or the fixation member is provided on the axial direction seal. Thereby, the contact property between the axial direction seal and the flange surface is enhanced compared to a case where a surface on the flange surface side of the axial direction seal and a surface on the fixation member side of the axial direction seal are flat surfaces, and therefore, it is possible to improve the sealing property between the axial direction seal and the flange surface.

According to the above configuration (5), a recess part to which the elastic protrusion part is fitted is provided on the flange surface or the fixation member. Thereby, even when water that flows on the shaft or an outer wall of the housing enters a space between the axial direction seal and the flange surface or the fixation member, it is possible to stop the water to the recess part.

Accordingly, it is possible to reliably prevent the water from entering the housing. Further, it is possible to prevent the position displacement in the radial direction between the axial direction seal and the flange surface or the fixation member, and therefore, it is possible to cause the press contact force of the fixation member to act equally on the axial direction seal. Accordingly, it is possible to improve the sealing property between the axial direction seal and the flange surface.

According to the above configuration (6), the elastic protrusion part has an annular shape so as to surround the slide end when seen from the direction along the axial line. Thereby, even when water that flows on the shaft or an outer wall of the housing enters a space between the axial direction seal and the flange surface or the fixation member, the water flows along the outer circumference of the elastic protrusion part, and therefore, it is possible to stop the water to a part on the outer circumference side of the elastic protrusion part. Accordingly, it is possible to reliably prevent the water from entering the housing.

According to the above configuration (7), a rib that protrudes radially outward so as to be in close contact with the cover is provided on the shaft. Thereby, it is possible to block water that flows on the shaft by the rib, and therefore, it is possible to reliably prevent the water that flows on the shaft from entering the cover.

According to the above configuration (8), a bending/stretching part that is capable of being bent and stretched when the shaft is slid is provided on the cover. Thereby, the position of the cover is not easily displaced when the shaft is slid, and therefore, it is possible to ensure the sealing property further effectively.

According to the above configuration (9), the bending/stretching part includes one folding part. Thereby, it is possible to ensure a restoration force of the cover to prevent the position displacement of the cover with respect to the shaft, and therefore, it is possible to ensure the sealing property further effectively. In addition, the cover has a simple shape compared to a case where the bending/stretching part includes a plurality of folding parts, and therefore, it is possible to improve the productivity of the cover.

According to the above configuration (10), the bending/stretching part includes a plurality of folding parts that are aligned in the direction along the axial line. Thereby, it is possible to cause the cover to be bent or stretched at the plurality of folding parts when the shaft is slid to prevent the position displacement of the cover, and therefore, it is possible to ensure the sealing property further effectively.

According to the above configuration (11), the cover includes an internal pressure adjusting part that adjusts an internal pressure by expanding or shrinking such that a volume of a space between the cover and the shaft is not changed when the bending/stretching part is bent or stretched in accordance with sliding of the shaft. Thereby, even when the cover is bent or stretched so as to be deformed when the shaft is slid, it is possible to maintain the atmospheric pressure inside the cover to a predetermined height, and therefore, it is possible to prevent suction of water into the cover. Accordingly, it is possible to improve the sealing properties.

According to the above configuration (12), it is possible to ensure the sealing property in a saddle riding type vehicle that includes the above stroke sensor.

DESCRIPTION OF THE EMBODIMENTS

Figure 1:
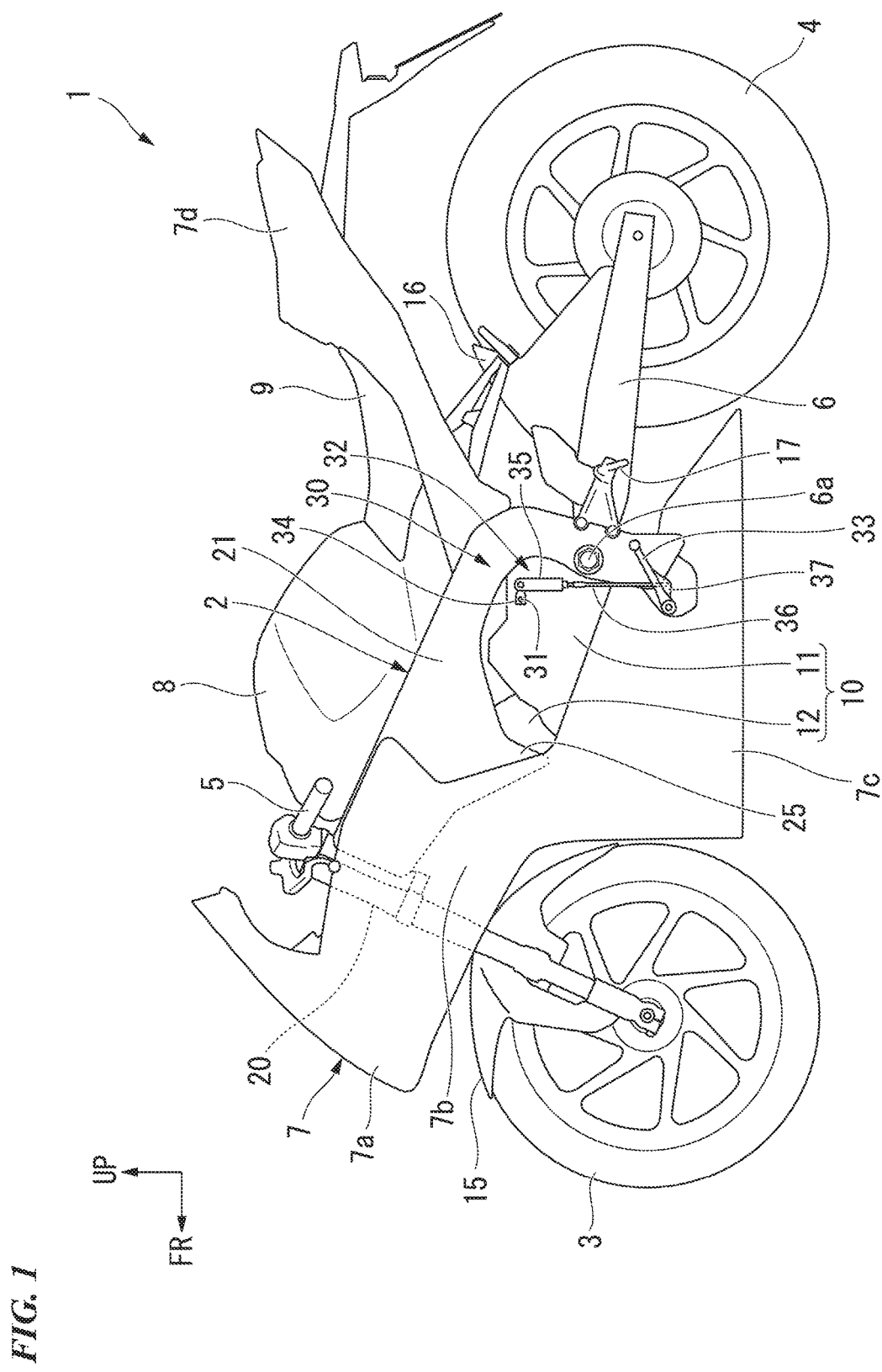
FIG. 1 is a left side view of a motorcycle according to a first embodiment.

Hereinafter, embodiments of the present invention will be described with reference to the drawings. Note that, front, rear, right, and left directions and the like in the following description are the same as front, rear, right, and left directions and the like of a vehicle described below if there is no particular description. In addition, in the drawings referred to in the following description, an arrow FR which indicates the front of the vehicle, an arrow LH which indicates the left of the vehicle, and an arrow UP which indicates the upside of the vehicle are shown.

First Embodiment

<Entire Vehicle>

FIG. 1 shows a motorcycle 1 as an example of a saddle riding type vehicle. With reference to FIG. 1, the motorcycle 1 includes a front wheel 3 that is steered using a handle 5 and a rear wheel 4 that is driven by a power unit 10 including an engine. Hereinafter, the motorcycle may be simply referred to as a "vehicle".

A steering system component including the handle 5 and the front wheel 3 is steerably and pivotally supported by a head pipe 20 that is formed on a front end part of a vehicle body frame 2. A handle steering shaft (not shown) that is connected to the handle 5 is inserted through the head pipe 20. The power unit 10 is arranged at a middle part in a front-to-rear direction of the vehicle body frame 2. A swing arm 6 is pivotally supported swingably upward and downward around a pivot shaft 6a on a rear part of the power unit 10. A rear suspension (not shown) is provided between a front part of the swing arm 6 and a rear part of the vehicle body frame 2.

For example, the vehicle body frame 2 is formed of a variety of steel materials integrally joined by welding or the like. The vehicle body frame 2 includes a pair of right and left main frames 21 that extend rearward and downward from the head pipe 20 and that are then bent downward to extend, a cross member (not shown) that extends in a vehicle width direction so as to connect the right and left main frames 21, and a seat rail (not shown) that extends rearward and upward from a rear upper end part of each of the right and left main frames 21. An engine hanger 25 that extends rearward and downward is provided on a front lower end part of each of the right and left main frames 21.

The power unit 10 is attached to the engine hanger 25 and a rear lower part of each of the right and left main frames 21. The power unit 10 includes a crankcase 11 and a cylinder part 12 that protrudes frontward and upward from an upper part of the crankcase 11 in side view.

A fuel tank 8 is arranged above the right and left main frames 21. A seat 9 is arranged on the seat rail (not shown) and at a rear position of the fuel tank 8.

The vehicle body frame 2 is covered by a vehicle body cover 7. The vehicle body cover 7 includes a front cowl 7a that covers a front part of the vehicle body frame 2, a front side cowl 7b that covers a front side part of the vehicle body frame 2, an under cowl 7c that covers a lower part of the vehicle body frame 2, and a rear cowl 7d that covers a rear part of the vehicle body frame 2.

A transmission device 30 is provided integrally on a rear part of the engine. The transmission device 30 includes a shift spindle 31 that protrudes leftward from a left side surface of the crankcase 11, a shift link mechanism 32 that is attached to a front end part of the shift spindle 31, and a shift pedal 33 that is connected to the shift link mechanism 32 as a shift speed change means.

The shift link mechanism 32 includes a shift arm 34 that is attached to a front end part of the shift spindle 31, a stroke sensor 35 having an upper end part that is connected rotatably to the shift arm 34 via a connection pin, a link 36 having an upper end part that is connected to a lower end part of the stroke sensor 35, a middle arm 37 that is attached rotatably to a support shaft (not shown) which is provided on the crankcase 11, and a control unit (ECU; Engine Control Unit) (not shown). One end part of the middle arm 37 is connected rotatably to a lower end part of the link 36 via a connection pin. The other end part of the middle arm 37 is connected rotatably to the shift pedal 33 via a connection pin.

The ECU functions as a control unit that receives a stroke signal (detection value of a stroke amount) from the stroke sensor 35. The ECU calculates a load (shift operation load) that is generated when a biasing member 63 described below is pressed by the stroke amount based on the stroke signal.

In FIG. 1, reference numeral 15 indicates a front fender, reference numeral 16 indicates a rear fender, and reference numeral 17 indicates a main step.

<Stroke Sensor>

Figure 2:
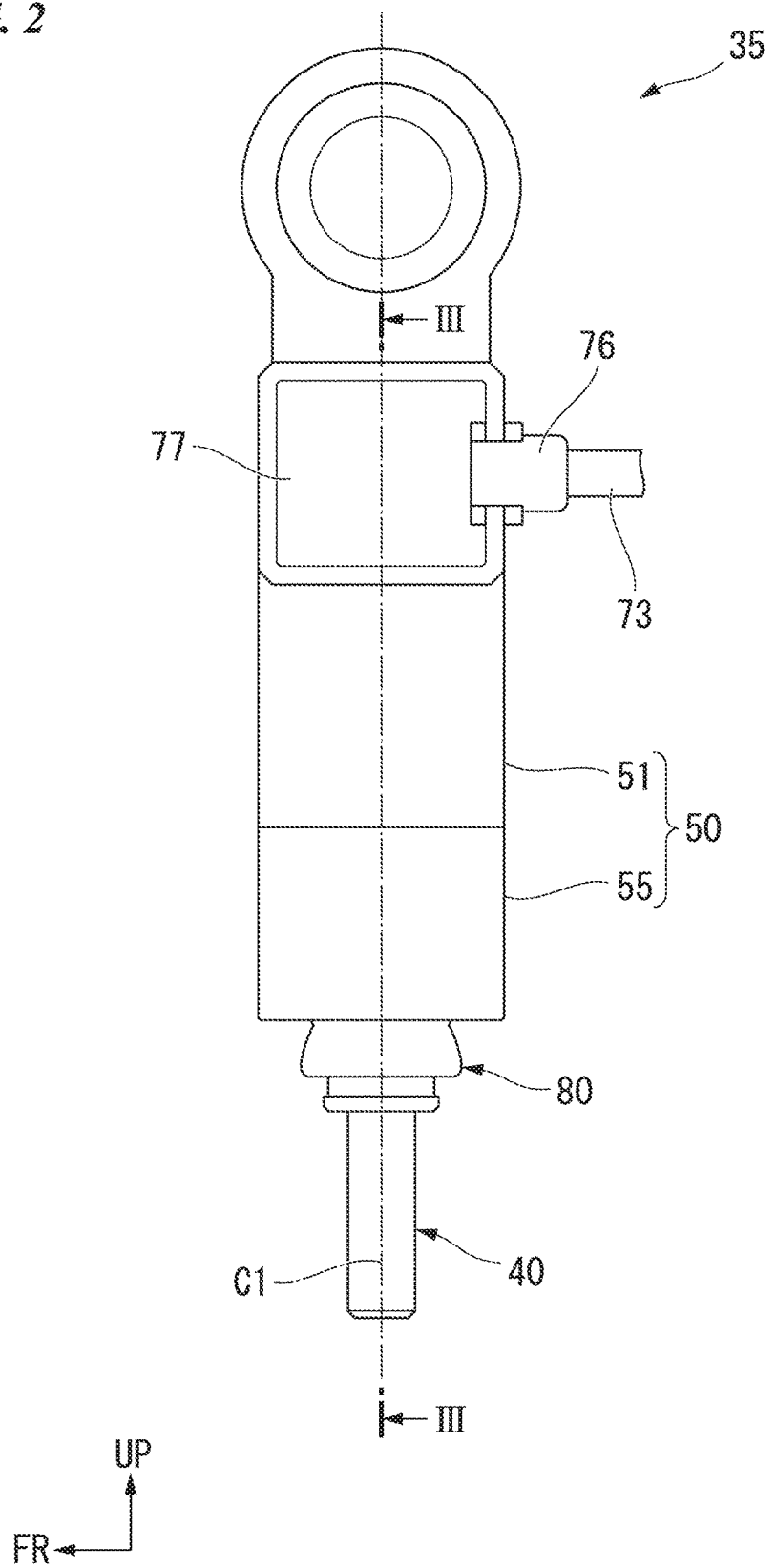
FIG. 2 is a left side view of a stroke sensor according to the first embodiment.

As shown in FIG. 2, the stroke sensor 35 includes: a shaft 40 that extends in a direction along an axial line C1; a housing 50 that extends along the shaft 40, houses the shaft 40 in a state where the shaft 40 protrudes outside, and supports the shaft 40 slidably in the direction along the axial line C1; an origin return means 60 (refer to FIG. 3) that causes the shaft 40 to return to an origin position; a detection part 70 (refer to FIG. 3) that detects a slide amount of the shaft 40; and a cover 80 that covers a slide end 55a (refer to FIG. 3) on a protrusion side of the shaft 40 in a slide region between the shaft 40 and the housing 50 while allowing a relative movement between the shaft 40 and the housing 50.

For ease of understanding, the axial line C1 in the drawing is matched with a line that extends in a vertical direction. In the following description, the direction along the axial line C1 may be referred to as an "axial line direction", an inner side of the vertical direction in the axial line direction may be referred to as an "axial line direction inside", and an outer side of the vertical direction in the axial line direction may be referred to as an "axial line direction outside".

<Shaft>

Figure 3:
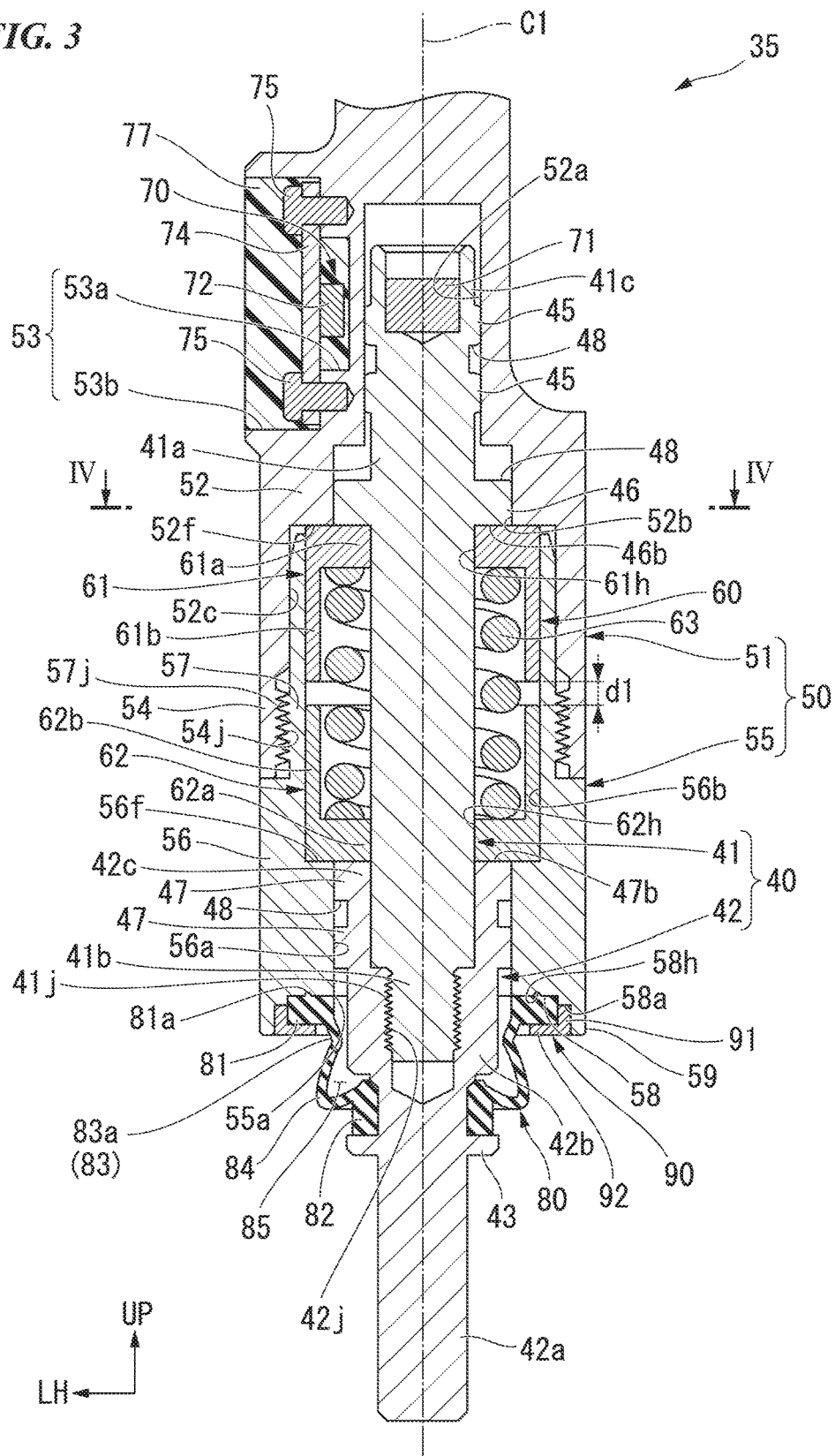
FIG. 3 is a cross-sectional view of FIG. 2.

As shown in FIG. 3, the shaft 40 includes a plurality of shaft members 41, 42 formed of a metal and which are connected to each other in the axial line direction. The plurality of shaft members 41, 42 includes a first shaft member 41 that is arranged at an upper position in the axial line direction and a second shaft member 42 that is arranged at a lower position in the axial line direction. A slide part 45 being in contact with an inner wall of the housing 50 and which slides so as to regulate the movement of the shaft 40 in a direction that is crossed with the axial line is provided on the first shaft member 41. A slide part 47 being in contact with an inner wall of the housing 50 and which slides so as to regulate the movement of the shaft 40 in the direction that is crossed with the axial line is provided on the second shaft member 42.

<First Shaft Member>

The first shaft member 41 is formed of a non-magnetic metal. For example, the first shaft member 41 is formed of an austenitic stainless steel (SUS; Steel Use Stainless).

The first shaft member 41 includes a first shaft member main body 41a that extends in the axial line direction, a connection part 41b that protrudes downward from a lower end of the first shaft member main body 41a and is connected to the second shaft member 42, a detected body holding part 41c that is provided on an upper end part of the first shaft member main body 41a and houses and holds a detected body 71, and an extended diameter part 46 that is close to an inner wall of the housing 50 while keeping a slight gap without coming into contact with the inner wall of the housing 50 (without sliding).

The first shaft member main body 41a has a column shape that extends linearly in the axial line direction. The outer circumferential surface of the first shaft member main body 41*a* is formed of a smooth surface.

The connection part 41*b* extends concentrically with the first shaft member main body 41*a*. The connection part 41*b* has a column shape having a smaller diameter than the first shaft member main body 41*a*. A male screw part 41*j* having a screw thread is formed on an outer circumferential surface of the connection part 41*b*.

The detected body holding part 41*c* has a recess shape that is recessed in the axial line direction inside from an upper end of the first shaft member main body 41*a*. The detected body 71 is pressed in and is held by the detected body holding part 41*c*. The detected body 71 is strongly fixed to the detected body holding part 41*c* by a fixation means such as an adhesion bond.

Figure 4:
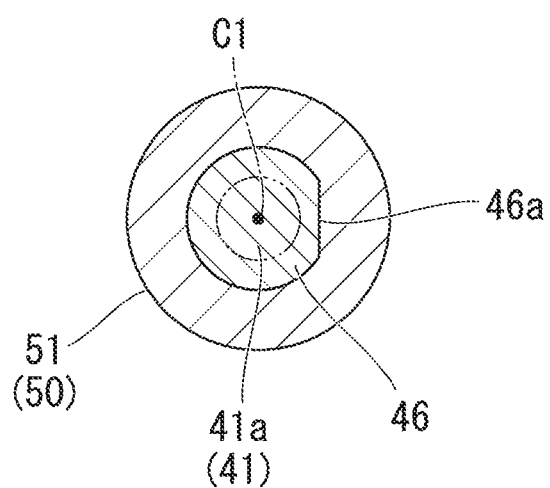
FIG. 4 is a view that corresponds to a IV-IV cross-section of FIG. 3.

As shown in FIG. 4, the extended diameter part 46 continues integrally to an outer circumferential surface of the first shaft member main body 41*a*. The extended diameter part 46 forms a D-shaped annular shape having an outer shape that is larger than the first shaft member main body 41*a* when seen from the axial line direction. A portion of the outer circumferential surface of the extended diameter part 46 forms a shape having a flat surface 46*a*. The inner wall of the housing 50 has a shape that corresponds to the outer circumferential surface of the extended diameter part 46. That is, the outline of the inner wall of the housing 50 is formed along the outline of the outer circumferential surface of the extended diameter part 46 when seen from the axial line direction.

<Second Shaft Member>

With reference back to FIG. 3, the second shaft member 42 is formed of a non-magnetic metal. Similarly to the first shaft member 41, the second shaft member 42 can be preferably formed of a non-magnetic metal but may be formed of a soft magnetic material such as a steel material. A distance to the detection part 70 (magnet, magnetic detection element, and the like) is ensured, and therefore, the impact degree to the magnetic field is low even when the second shaft member 42 is formed of a soft magnetic material such as a steel material. It is possible to arbitrarily select a material of the second shaft member 42 in consideration of costs or strength.

The second shaft member 42 includes a second shaft member main body 42*a* that extends in the axial line direction, a connected part 42*b* that is provided on an upper end part of the second shaft member main body 42*a* and is connected to the first shaft member 41, and a guide part 42*c* that guides a lower end part of the first shaft member main body 41*a*. A rib 43 that protrudes outward in a radial direction so as to be in close contact with the cover 80 is provided on the second shaft member 42.

The second shaft member main body 42*a* has a column shape that extends linearly concentrically with the first shaft member main body 41*a*. The second shaft member main body 42*a* protrudes downward from the housing 50 and is exposed outside.

The connected part 42*b* extends concentrically with the second shaft member main body 42*a*. The connected part 42*b* has a cylindrical shape having a larger diameter than the second shaft member main body 42*a*. A female screw part 42*j* having a screw thread is formed on an inner circumferential surface of the connected part 42*b*. The male screw part 41*j* of the first shaft member 41 is connected to the female screw part 42*j* of the second shaft member 42 by screwing. For example, a reinforcement adhesion bond such as a seal lock agent is filled in a space between the connection part 41*b* and the connected part 42*b* from the viewpoint of preventing the screw from being loosened.

The guide part 42*c* has a cylindrical shape that continues to an upper end of the connected part 42*b*. The guide part 42*c* has substantially the same outer shape as the connected part 42*b* when seen from the axial line direction. The guide part 42*c* has a larger inner shape than the connected part 42*b* when seen from the axial line direction. The inner shape of the guide part 42*c* has a size that corresponds to the outer shape of the first shaft member main body 41*a* when seen from the axial line direction so as to be capable of guiding the first shaft member main body 41*a*. The inner circumferential surface of the guide part 42*c* is formed of a smooth surface.

<Slide Part>

A plurality of slide parts 45, 47 includes a plurality of (for example, two in the present embodiment) holding part-side slide parts 45 that are provided on the detected body holding part 41*c* and a plurality of (for example, two in the present embodiment) non-holding part-side slide parts 47 that are provided at a position which avoids the detected body holding part 41*c*. The two non-holding part-side slide parts 47 are provided on the second shaft member 42.

The holding part-side slide part 45 continues integrally to an outer circumferential surface of the detected body holding part 41*c*. The holding part-side slide part 45 forms an annular shape having an outer shape that is larger than the detected body holding part 41*c* when seen from the axial line direction.

The non-holding part-side slide part 47 continues integrally to an outer circumferential surface of the guide part 42*c* of the second shaft member 42. The non-holding part-side slide part 47 forms a D-shaped annular shape having an outer shape that is larger than the guide part 42*c* when seen from the axial line direction.

The outer shape of the extended diameter part 46 and the outer shape of the non-holding part-side slide part 47 have substantially the same size when seen from the axial line direction. The outer shape of the holding part-side slide part 45 is smaller than the outer shape of the non-holding part-side slide part 47 when seen from the axial line direction.

Figure 5:
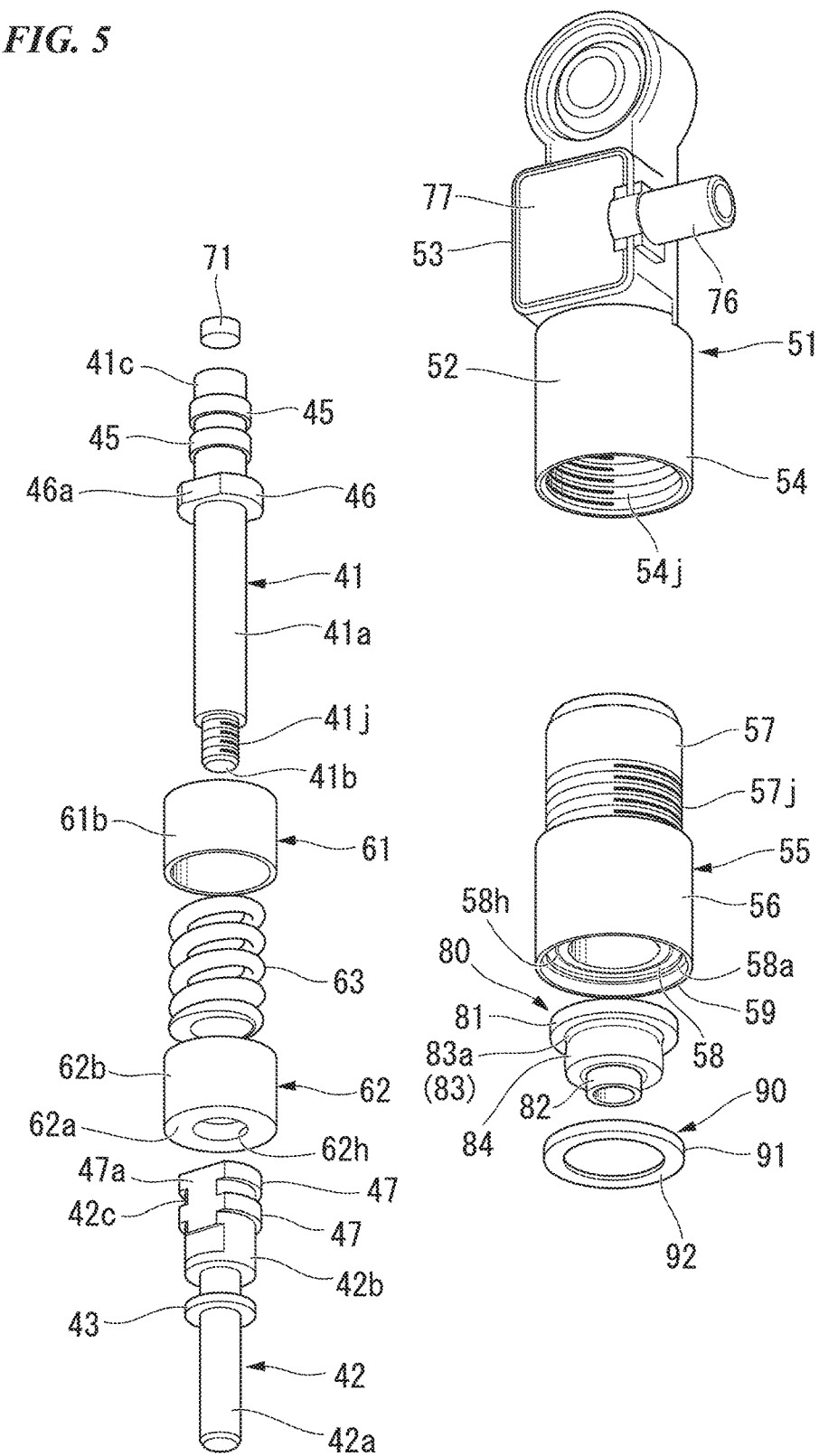
FIG. 5 is an exploded perspective view of the stroke sensor according to the first embodiment.

As shown in FIG. 5, a portion of the outer circumferential surface of the non-holding part-side slide part 47 forms a shape having a flat surface 47*a*. That is, the flat surface 47*a* is formed on the non-holding part-side slide part 47.

The non-holding part-side slide part 47 has an outer shape that is relatively large when seen from the axial line direction.

As shown in FIG. 3, a groove part 48 that is recessed inward in the radial direction than the inner wall of the housing 50 is provided on the shaft 40. In the first shaft member 41, the groove part 48 is formed between the two holding part-side slide parts 45 that are adjacent to each other in the axial line direction and between the holding part-side slide part 45 and the extended diameter part 46 that are adjacent to each other in the axial line direction. In the second shaft member 42, the groove part 48 is formed between the two non-holding part-side slide parts 47 that are adjacent to each other in the axial line direction. A lubricant (not shown) is arranged on the groove part 48.

<Housing>

The housing 50 includes a first housing half body 51 and a second housing half body 55 that are divided in the axial line direction.

<First Housing Half Body>

The first housing half body 51 is formed of a non-magnetic material. For example, the first housing half body 51 is formed of a metal material such as aluminum and a stainless steel or a resin material such as polybutylene terephthalate (PBT).

The first housing half body 51 includes a first housing half body main body 52 that extends in the axial line direction, a detection body housing part 53 that is provided on an upper side part of the first housing half body main body 52 and houses a detection body 72, and a connected part 54 that is provided on a lower end part of the first housing half body main body 52 and is connected to the second housing half body 55.

The first housing half body main body 52 has a tube shape that houses the first shaft member 41 slidably. The first housing half body main body 52 includes a holding part-side inner wall 52a that slidably holds the holding part-side slide part 45, a first non-holding part-side inner wall 52b that surrounds the extended diameter part 46 and has a larger inner shape than the holding part-side inner wall 52a when seen from the axial line direction, and a guide inner wall 52c that guides the second housing half body 55 and has a larger inner shape than the first non-holding part-side inner wall 52b when seen from the axial line direction. A first piston regulation surface 52f that regulates the movement in the axial line direction (upward) of a first piston 61 of the origin return means 60 is provided between the first non-holding part-side inner wall 52b and the guide inner wall 52c.

The detection body housing part 53 is arranged at a part that overlaps in the radial direction with a movement region in the axial line direction of the detected body 71. The detection body housing part 53 includes a detection body housing recess part 53a that houses the detection body 72, and a substrate housing part 53b that has a larger inner shape than the detection body housing recess part 53a, opens outward in the radial direction, and is in communication with the detection body housing recess part 53a. A printed-wiring board 74 that is connected to an external apparatus (not shown) via a cable 73 (refer to FIG. 2) is housed in the substrate housing part 53b. The printed-wiring board 74 is fixed to the first housing half body 51 by a plurality of screws 75.

A grommet 76 (refer to FIG. 2) that protects the cable 73 is provided at a connection part with the printed-wiring board 74 in the cable 73. A filling member 77 such as a potting material is provided on the detection body housing part 53 and the substrate housing part 53b in terms of making the detection body 72, the printed-wiring board 74, and the connection part between the printed-wiring board 74 and the cable 73 be airtight.

The connected part 54 has a cylindrical shape that extends concentrically with the first housing half body main body 52. A female screw part 54j having a screw thread is formed on an inner circumferential surface of the connected part 54.

<Second Housing Half Body>

The second housing half body 55 is formed of a non-magnetic material. Similarly to the first housing half body 51, the second housing half body 55 can be preferably formed of a non-magnetic metal but may be formed of a soft magnetic material such as a steel material. A distance to the detection part 70 (magnet, magnetic detection element, and the like) is ensured, and therefore, the impact degree to the magnetic field is low even when the second housing half body 55 is formed of a soft magnetic material such as a steel material. It is possible to arbitrarily select a material of the second housing half body 55 in consideration of costs or strength.

The second housing half body 55 includes a second housing half body main body 56 that extends in the axial line direction, and a connection part 57 that is provided on an upper end part of the second housing half body main body 56 and is connected to the first housing half body 51. A flange surface 58 that extends outward in the radial direction from the slide end 55a and a protrusion wall 59 that protrudes outward in the axial line direction (that is, downward) from an outer circumferential part of the flange surface 58 are provided on the second housing half body 55.

The second housing half body main body 56 has a tube shape that houses the second shaft member 42 slidably. The second housing half body main body 56 includes a second non-holding part-side inner wall 56a that slidably holds the non-holding part-side slide part 47, and an origin return means housing inner wall 56b that houses the origin return means 60 and has a larger inner shape than the second non-holding part-side inner wall 56a when seen from the axial line direction. A second piston regulation surface 56f that regulates the movement in the axial line direction (downward) of a second piston 62 of the origin return means 60 is provided between the second non-holding part-side inner wall 56a and the origin return means housing inner wall 56b.

The connection part 57 has a cylindrical shape that extends concentrically with the second housing half body main body 56. A male screw part 57j having a screw thread is formed on an outer circumferential surface of the connection part 57. The male screw part 57j of the second housing half body main body 56 is connected to the female screw part 54j of the first housing half body 51 by screwing. For example, a reinforcement adhesion bond such as a seal lock agent is filled in a space between the connection part 57 and the connected part 54 from the viewpoint of preventing the screw from being loosened.

The holding part-side inner wall 52a of the first housing half body 51 and the second non-holding part-side inner wall 56a of the second housing half body 55 have a different shape from each other when seen from the axial line direction. The holding part-side slide part 45 and the non-holding part-side slide part 47 have a different shape from each other when seen from the axial line direction.

<Origin Return Means>

The origin return means 60 includes a pair of the pistons 61, 62 that are aligned in the axial line direction and the biasing member 63 that is provided between the pair of the pistons 61, 62 and that biases the pair of the pistons 61, 62 such that the pistons are separated from each other.

Each of the pair of the pistons 61, 62 is formed of a non-magnetic material. Each of the pair of the pistons 61, 62 can be preferably formed of a non-magnetic metal but may be formed of a soft magnetic material such as a steel material. A distance to the detection part 70 (magnet, magnetic detection element, and the like) is ensured, and therefore, the impact degree to the magnetic field is low even when each of the pair of the pistons 61, 62 is formed of a soft magnetic material such as a steel material. It is possible to arbitrarily select a material of the pair of the pistons 61, 62 in consideration of durability or strength.

The pair of the pistons 61, 62 includes the first piston 61 that is arranged at an upper position in the axial line direction and the second piston 62 that is arranged at a lower position in the axial line direction.

The first piston 61 includes: a slide bottom wall 61a having an annular shape when seen from the axial line direction and which is slidably supported by the first shaft member main body 41a; and an outer circumferential wall 61b having a tube shape so as to surround the biasing member 63 and which protrudes downward from an outer circumferential part of the slide bottom wall 61a.

The second piston 62 includes: a slide bottom wall 62a having an annular shape when seen from the axial line direction and which is slidably supported by the first shaft member main body 41a; and an outer circumferential wall 62b having a tube shape so as to surround the biasing member 63 and which protrudes upward from an outer circumferential part of the slide bottom wall 62a. That is, the second piston 62 has a vertically inverted shape of the first piston 61. A penetration hole 61h that opens in the axial line direction is formed on the slide bottom wall 61a of the first piston 61. A penetration hole 62h that opens in the axial line direction is formed on the slide bottom wall 62a of the second piston 62.

The first piston 61 and the second piston 62 are arranged between the first piston regulation surface 52f and the second piston regulation surface 56f in the housing 50. The first piston 61 is arranged so as to have a clearance between the outer circumferential wall 61b of the first piston 61 and the origin return means housing inner wall 56b of the second housing half body 55. The second piston 62 is arranged so as to have a clearance between the outer circumferential wall 62b of the second piston 62 and the origin return means housing inner wall 56b of the second housing half body 55. Thereby, even when stress is applied to the shaft 40 by a large load being applied after being installed in a vehicle, the first piston 61 and the second piston 62 do not easily come into contact with the origin return means housing inner wall 56b, and therefore, it is possible to prevent a factor that affects an operation feeling such as the first piston 61, the second piston 62, the origin return means housing inner wall 56b, and the biasing member 63 being damaged.

For example, the biasing member 63 is a coil spring that is formed of a non-magnetic metal such as a stainless steel and SUS304WPB. The biasing member 63 may be formed of a soft magnetic material (for example, a hard steel wire such as SWB and SWC). A distance to the detection part 70 (magnet, magnetic detection element, and the like) is ensured, and therefore, the impact degree to the magnetic field is low even when the biasing member 63 is formed of a soft magnetic material. It is possible to arbitrarily select a material of the biasing member 63 in consideration of durability or strength.

The biasing member 63 constantly biases the first piston 61 and the second piston 62 in the axial line direction such that the first piston 61 and the second piston 62 are separated from each other. That is, even when the shaft 40 is at any position, the biasing member 63 can press the first piston 61 to come into contact with the first piston regulation surface 52f and an end surface 46b of the extended diameter part 46 and can press the second piston 62 to come into contact with the second piston regulation surface 56f and an end surface 47b of the non-holding part-side slide part 47. Therefore, even when a clearance is provided between the outer circumferential wall 61b of the first piston 61 and the origin return means housing inner wall 56b of the second housing half body 55, and a clearance is provided between the outer circumferential wall 62b of the second piston 62 and the origin return means housing inner wall 56b of the second housing half body 55, it is possible to prevent the vibration of the first piston 61 and the second piston 62, and it is possible to obtain a constant operation feeling with respect to the stroke of the shaft 40. Additionally, the vibration of the first piston 61 and the second piston 62 is prevented, and thereby, it is possible to stabilize the detection accuracy by the detection body 72.

When the shaft 40 is at an origin position, an inter-shaft distance is regulated by the first piston 61 being in contact with the first piston regulation surface 52f and the end surface 46b of the extended diameter part 46 and the second piston 62 being in contact with the second piston regulation surface 56f and the end surface 47b of the non-holding part-side slide part 47. The "inter-shaft distance" means a distance between the lower end of the outer circumferential wall 61b of the first piston 61 and the upper end of the outer circumferential wall 62b of the second piston 62. When the shaft 40 is at the origin position, the lower end of the outer circumferential wall 61b of the first piston 61 and the upper end of the outer circumferential wall 62b of the second piston 62 are separated in the axial line direction from each other, and therefore, the separated distance dl is a stroke (detection stroke) of the shaft 40 that is detected by the detection body 72.

When the shaft 40 at the origin position is displaced so as to be pushed into the housing 50 (that is, so as to be pushed upward), in a state where the first piston 61 is in contact with the first piston regulation surface 52f, the second piston 62 comes into contact with and is supported by the end surface 47b of the non-holding part-side slide part 47 to be moved upward against the biasing force of the biasing member 63, and thereby, the second piston 62 is separated from the second piston regulation surface 56f. The shaft 40 is movable upward until the upper end of the outer circumferential wall 62b of the second piston 62 comes into contact with the lower end of the outer circumferential wall 61b of the first piston 61. When no force that presses the shaft 40 upward is applied, the shaft 40 returns to the origin position by the biasing force of the biasing member 63.

On the other hand, when the shaft 40 at the origin position is displaced so as to be drawn from the housing 50 (that is, so as to be drawn downward), in a state where the second piston 62 is in contact with the second piston regulation surface 56f, the first piston 61 comes into contact with and is supported by the end surface 46b of the extended diameter part 46 to be moved downward against the biasing force of the biasing member 63, and thereby, the first piston 61 is separated from the first piston regulation surface 52f. The shaft 40 is movable downward until the lower end of the outer circumferential wall 61b of the first piston 61 comes into contact with the upper end of the outer circumferential wall 62b of the second piston 62. When no force that draws the shaft 40 downward is applied, the shaft 40 returns to the origin position by the biasing force of the biasing member 63.

A lubricant such as grease is applied on the origin return means housing inner wall 56b that houses the first piston 61 and the second piston 62. Thereby, it is possible to stably ensure the sliding of the first piston 61 and the second piston 62 with respect to the shaft 40 in the long term.

<Detection Part>

The detection part 70 includes the detected body 71 that is fixed to the shaft 40 and the detection body 72 that detects the movement amount of the detected body 71 which is moved in accordance with the sliding of the shaft 40.

<Detected Body>

For example, the detected body 71 is a SmCo sintered magnet having a circular column shape and two magnetized poles in the axial line direction. The detected body 71 is displaced together with the shaft 40 in the axial line direction, and thereby, the direction of a magnetic field (magnetic force) that is given to the detection body 72 is changed. Thereby, the movement amount of the detected body 71 is detected by the detection body 72.

The shape of the detected body 71 is not limited to a circular column shape. The detected body 71 may have a square column shape. The detected body 71 may be a rare-earth magnet such as a samarium-cobalt magnet and a neodymium magnet.

The detected body 71 is not limited to a sintered magnet. The detected body 71 may be a plastic magnet. The sintered magnet has a stronger magnetic force than the plastic magnet. On the other hand, the plastic magnet has a superior mass production property and a superior cracking-resistant property than the sintered magnet. Therefore, the magnet used for the detected body 71 may be arbitrarily selected in accordance with use conditions or design requirement.

<Detection Body>

The detection body 72 includes a plurality of magnetic detection elements. For example, the detection body 72 is formed as a magnetic detection package in which a plurality of Hall elements (magnetic detection elements) are mounted on a circuit board. The detection body 72 converts the change of a magnetic force in accordance with the displacement such as the movement of the detected body 71 into an electric signal and outputs the converted electric signal outside.

The magnetic detection surface of the detection body 72 is arranged in a direction that is orthogonal to the magnetization direction of the detected body 71.

The detection body 72 is provided on a surface on the detected body 71 side of the printed-wiring board 74. The detection body 72 is made be airtight by the filling member 77 described above in a state where the detection body 72 is housed in the detection body housing part 53. Thereby, the gap between the detection body 72 and the detected body 71 is made as small as possible, and it is possible to detect the change of the magnetic field with high accuracy. The airtightness may be maintained using a packing or a lid member (not shown).

The detection body 72 detects a magnetic field (a magnetic field in a vertical direction with respect to the magnetic detection surface and a magnetic field in two horizontal directions with respect to the magnetic detection surface) by the detected body 71 using the plurality of Hall elements. Angle calculation is performed on the obtained magnetic field in two directions using a trigonometric function (ATAN) in a processing circuit (for example, ASIC; Application Specific Integrated Circuit), and the calculation result is output as angle information. The output angle information is proportional to the movement amount (stroke) of the shaft 40, and therefore, it is possible to detect the movement amount of the shaft 40 eventually.

The output method from the detection body 72 may be any method and may be selected corresponding to an ECU (not shown) that uses the detection result of the detection body 72 and the like. Examples of the output method from the detection body 72 include an analog method, a pulse width modulation (PWM) method, and a single edge nibble transmission (SENT) method.

<Cover>

The cover 80 has a tube shape so as to close the gap between the second shaft member 42 of the shaft 40 and the second housing half body 55 of the housing 50. The cover 80 is formed of an elastic member such as a rubber.

The cover 80 includes an axial direction seal 81 that is in close contact with the flange surface 58 in the axial line direction, a radial direction seal 82 that is in close contact with the second shaft member 42 of the shaft 40 in the radial direction, a bending/stretching part 83 that is provided between the axial direction seal 81 and the radial direction seal 82 and that is capable of being bent and stretched when the shaft 40 is slid, and an internal pressure adjusting part 84 that adjusts the pressure (internal pressure) in the cover 80.

Figure 6:
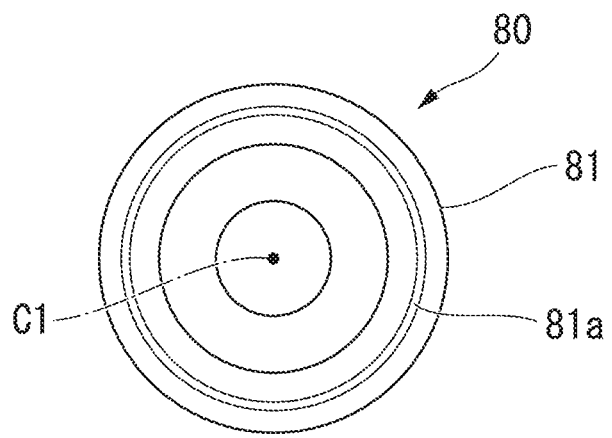
FIG. 6 is a plan view of an axial direction seal of a cover according to the first embodiment.

An elastic protrusion part 81*a* that protrudes toward the flange surface 58 is provided on the axial direction seal 81. As shown in FIG. 6, the elastic protrusion part 81*a* has an annular shape so as to surround the slide end 55*a* (refer to FIG. 3) when seen from the axial line direction.

Figure 7:
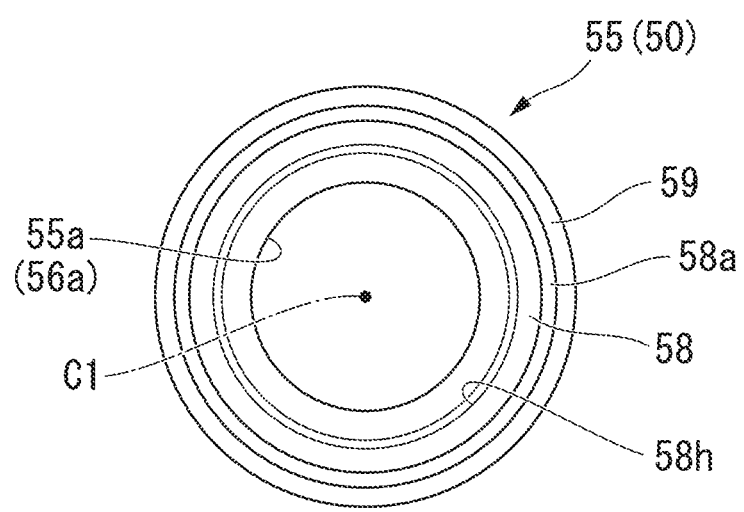
FIG. 7 is a plan view of a flange surface of a housing according to the first embodiment.

On the other hand, a recess part 58*h* to which the elastic protrusion part 81*a* is fitted is provided on the flange surface 58. As shown in FIG. 7, the recess part 58*h* has an annular shape so as to surround the slide end 55*a* when seen from the axial line direction. That is, the recess part 58*h* has an outer shape that is overlapped with the elastic protrusion part 81*a* when seen from the axial line direction.

A step part 58*a* that has an annular shape when seen from the axial line direction and is higher by one step than the flange surface 58 is formed close to the outer circumference of the flange surface 58. Thereby, when attaching the cover 80, the cover 80 can be temporarily joined until the cover 80 is fixed by a fixation member 90.

As shown in FIG. 3, the radial direction seal 82 is arranged such that the inner circumferential surface of the radial direction seal 82 is in close contact with the outer circumferential surface of the second shaft member main body 42*a* and such that the lower end of the radial direction seal 82 is in close contact with the upper surface of the rib 43.

The bending/stretching part 83 includes one folding part 83*a* that is arranged at a position close to the housing 50.

In the cross-sectional view of FIG. 3, the internal pressure adjusting part 84 extends from the inner end in the radial direction of the axial direction seal 81 such that a lower part is gradually positioned more inside in the radial direction, is then bent at the folding part 83*a* to extend such that a lower part is positioned more outside in the radial direction, and is then bent inside in the radial direction to extend to arrive at the upper end of the radial direction seal 82.

The internal pressure adjusting part 84 adjusts the internal pressure by expanding or shrinking such that the volume (hereinafter, referred to as an "air volume") of a space 85 between the cover 80 and the shaft 40 is not changed when the bending/stretching part 83 is bent or stretched in accordance with sliding of the shaft 40.

Figure 8:
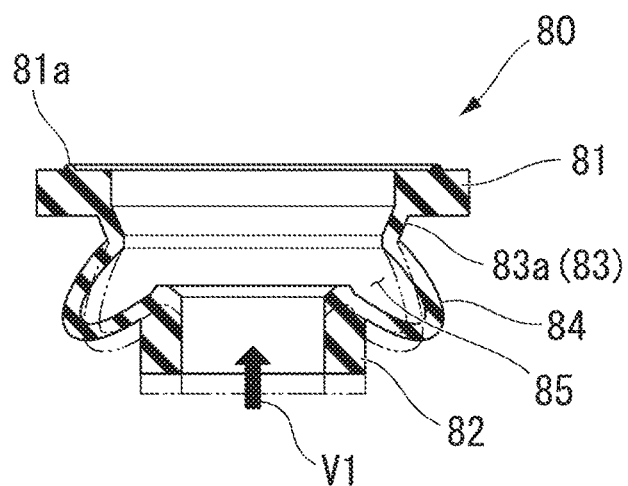
FIG. 8 is a view when a bending/stretching part of the cover according to the first embodiment is bent.

For example, when the shaft 40 at the origin position is displaced so as to be pushed into the housing 50 (that is, so as to be pushed upward), as shown in FIG. 8, the bending/stretching part 83 is bent by the cover 80 being pushed in a direction represented by an arrow V1, and the internal pressure adjusting part 84 expands such that the air volume is not changed. The two-dot chain line in the drawing represents the contour of the cover 80 at the origin position.

Figure 9:
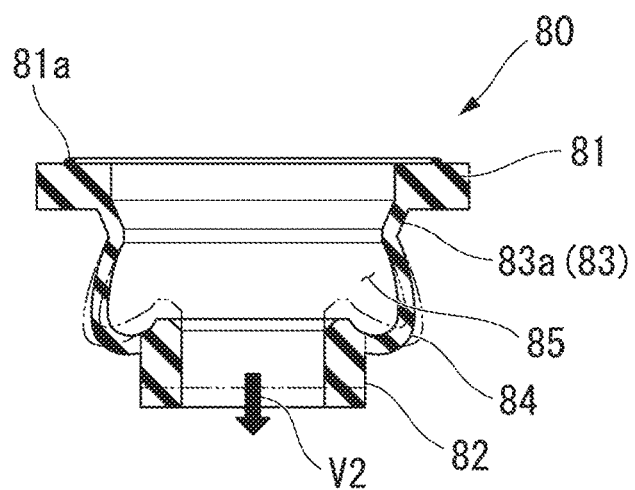
FIG. 9 is a view when the bending/stretching part of the cover according to the first embodiment is stretched.

On the other hand, when the shaft 40 at the origin position is displaced so as to be drawn from the housing 50 (that is, so as to be drawn downward), as shown in FIG. 9, the bending/stretching part 83 is stretched by the cover 80 being drawn in a direction represented by an arrow V2, and the internal pressure adjusting part 84 shrinks such that the air volume is not changed. The two-dot chain line in the drawing represents the contour of the cover 80 at the origin position.

<Fixation Member>

As shown in FIG. 3, the stroke sensor 35 further includes the fixation member 90 that presses the axial direction seal 81 to be in contact with the flange surface 58. For example, the fixation member 90 is formed of a metal member. As shown in FIG. 5, the fixation member 90 has a bowl shape and includes: a circumferential wall 91 having a tube shape and that is fitted to the protrusion wall 59; and a bottom wall 92 having an annular shape and that continues to the circumferential wall 91 and presses the axial direction seal 81 to be in contact with the flange surface 58.

<Assembly Method of Stroke Sensor>

Hereinafter, an example of an assembly method of the stroke sensor 35 is described.

Figure 10:
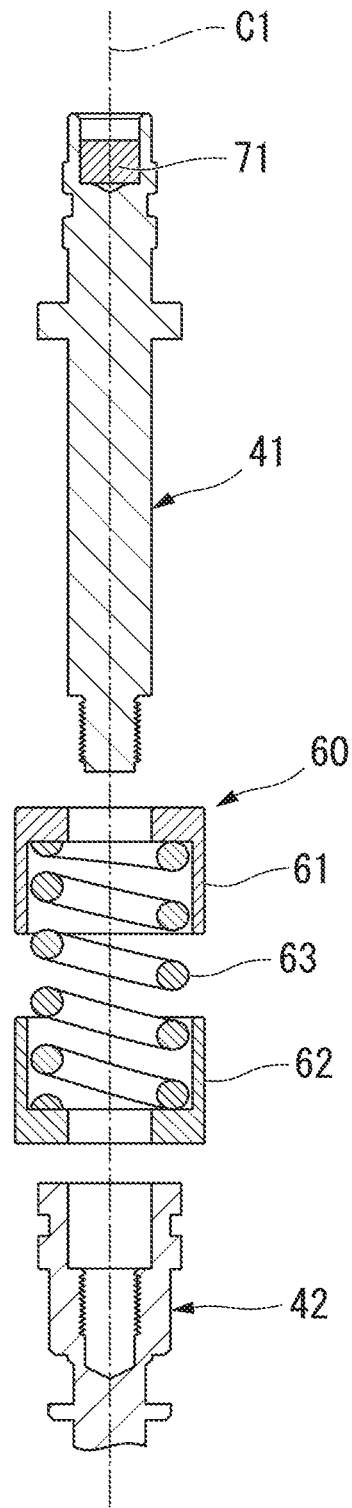
FIG. 10 is a view showing a shaft before attachment according to the first embodiment.

As shown in FIG. 10, first, the first shaft member 41 to which the detected body 71 is fixed, the origin return means 60 in which the biasing member 63 is interposed between the first piston 61 and the second piston 62, and the second shaft member 42 are aligned in the axial line direction.

Figure 11:
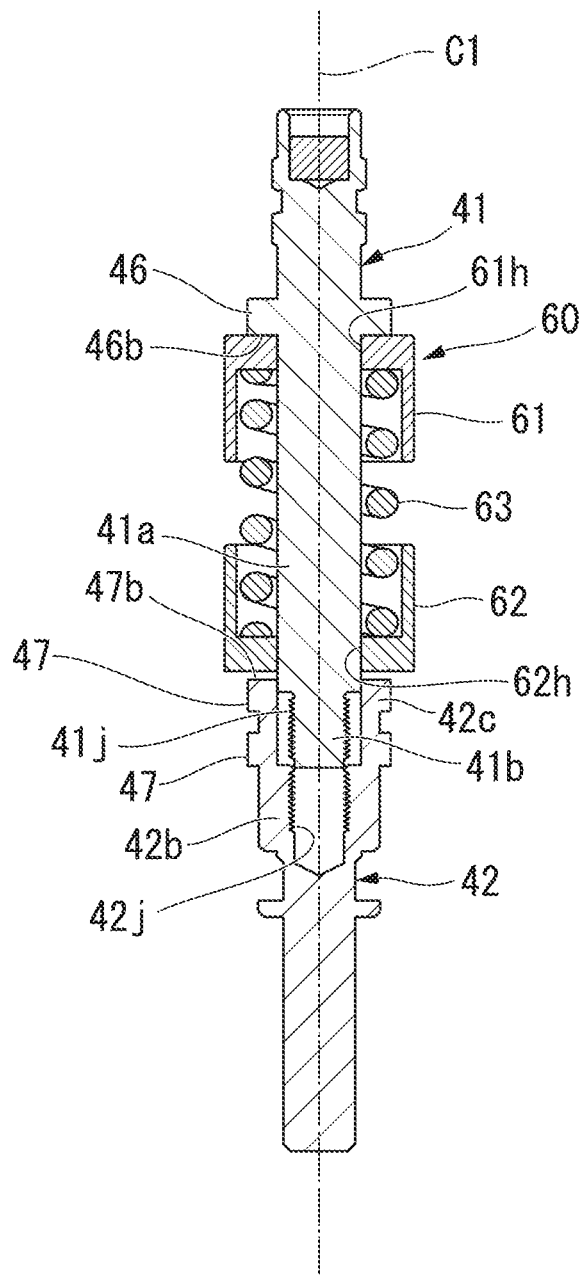
FIG. 11 is a view showing the shaft before attachment following FIG. 10.

As shown in FIG. 11, next, the first shaft member 41 is inserted through a shaft center opening (that is, the penetration hole 61h of the first piston 61 and the penetration hole 62h of the second piston 62) of the origin return means 60 from the connection part 41b. At this time, the lower end of the connection part 41b of the first shaft member 41 comes into contact with the opening end of the connected part 42b of the second shaft member 42, and thereby, the positions of the first shaft member 41 and the second shaft member 42 in the axial line direction are matched with each other. Accordingly, the screwing by the male screw part 41j of the connection part 41b and the female screw part 42j of the connected part 42b can be performed while maintaining the concentric state between the first shaft member 41 and the second shaft member 42.

Before the male screw part 41j of the connection part 41b is screwed to the female screw part 42j of the connected part 42b, the lower end part of the first shaft member main body 41a comes into contact with and is fitted to the inner circumferential surface on the opening end side of the guide part 42c of the second shaft member 42, and thereby, the first shaft member 41 becomes concentric with the second shaft member 42. Thereby, the screwing by the male screw part 41j of the connection part 41b and the female screw part 42j of the connected part 42b can be performed while maintaining the concentric state between the first shaft member 41 and the second shaft member 42 and while interposing the origin return means 60 by the end surface 46b of the extended diameter part 46 and the end surface 47b of the non-holding part-side slide part 47. Accordingly, even when there is a repulsion force (elastic force) by the biasing member 63, the screwing between the connection part 41b and the connected part 42b can be easily performed without axial displacement between the first shaft member 41 and the second shaft member 42.

Additionally, the non-holding part-side slide part 47 is provided on the outer circumferential surface of the guide part 42c of the second shaft member 42, and thereby, it is possible to pivotally support the first shaft member 41 and the second shaft member 42 at a position where the non-holding part-side slide part 47 is provided. Therefore, even when the shaft 40 has a divided structure, it is possible to maintain the axial accuracy of the shaft 40 with high accuracy. Further, the first shaft member 41 and the second shaft member 42 are pivotally supported at the position where the non-holding part-side slide part 47 is provided, and thereby, the pivot support parts of the first shaft member 41 and the second shaft member 42 are not easily deformed. Therefore, even when the shaft 40 has a divided structure, it is possible to maintain detection with high accuracy.

Figure 12:
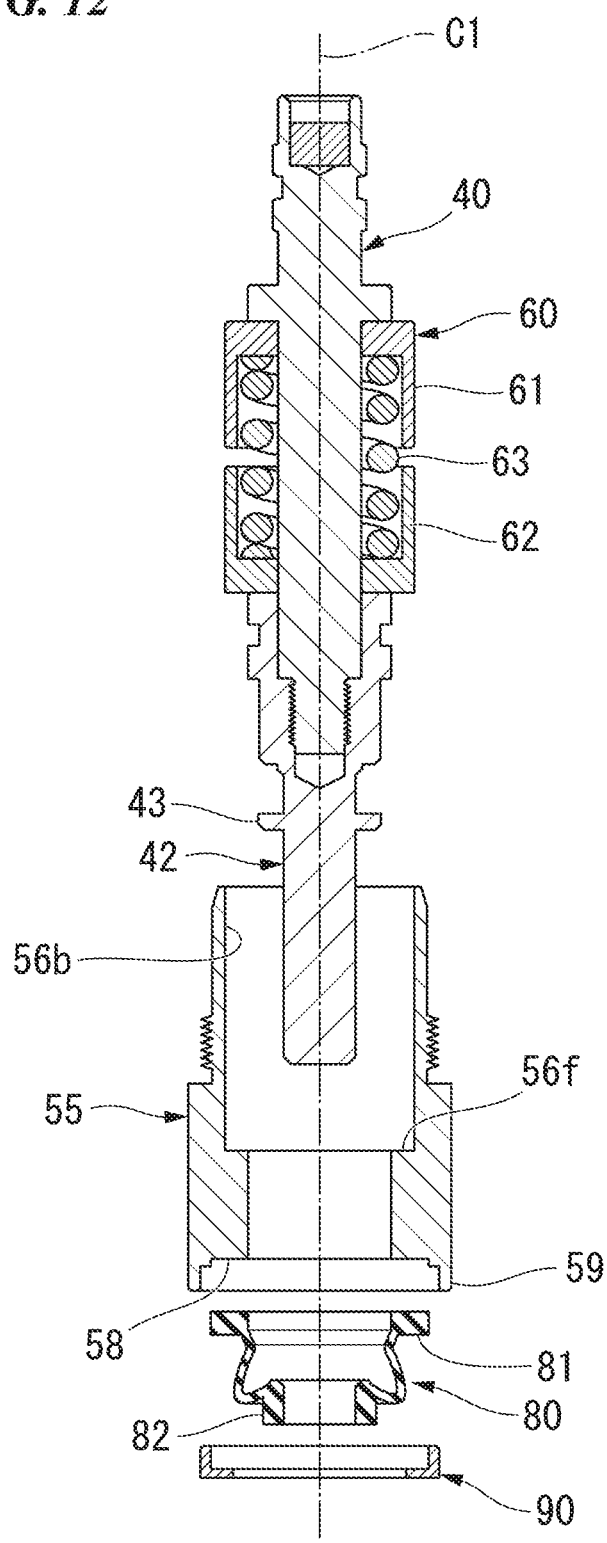
FIG. 12 is a view showing the housing before attachment according to the first embodiment.

As shown in FIG. 12, next, the shaft 40 in which the origin return means 60 is provided is inserted through an opening (that is, the origin return means housing inner wall 56b) of the second housing half body 55 from the lower end of the second shaft member 42. As described above, the first piston 61 in the origin return means 60 is arranged so as to have a clearance between the outer circumferential wall 61b of the first piston 61 and the origin return means housing inner wall 56b of the second housing half body 55, and the second piston 62 in the origin return means 60 is arranged so as to have a clearance between the outer circumferential wall 62b of the second piston 62 and the origin return means housing inner wall 56b of the second housing half body 55 (refer to FIG. 3). Thereby, it is possible to improve the workability when attaching the shaft 40 to the second housing half body 55.

When the shaft 40 is just inserted through the second housing half body 55 (that is, when the second piston 62 comes into contact with the second piston regulation surface 56f, and the second shaft member 42 protrudes downward than the second housing half body 55), after the axial direction seal 81 of the cover 80 is caused to come into close contact with the flange surface 58, the fixation member 90 is pressed into and is fitted to the protrusion wall 59, and thereby, the axial direction seal 81 is fitted to the lower end part of the second housing half body 55.

At this time, the rib 43 of the second shaft member 42 is inserted in the opening of the radial direction seal 82 of the cover 80, and the radial direction seal 82 of the cover 80 is caused to come into close contact with the outer circumferential surface of the second shaft member 42 and the upper surface of the rib 43.

Figure 13:
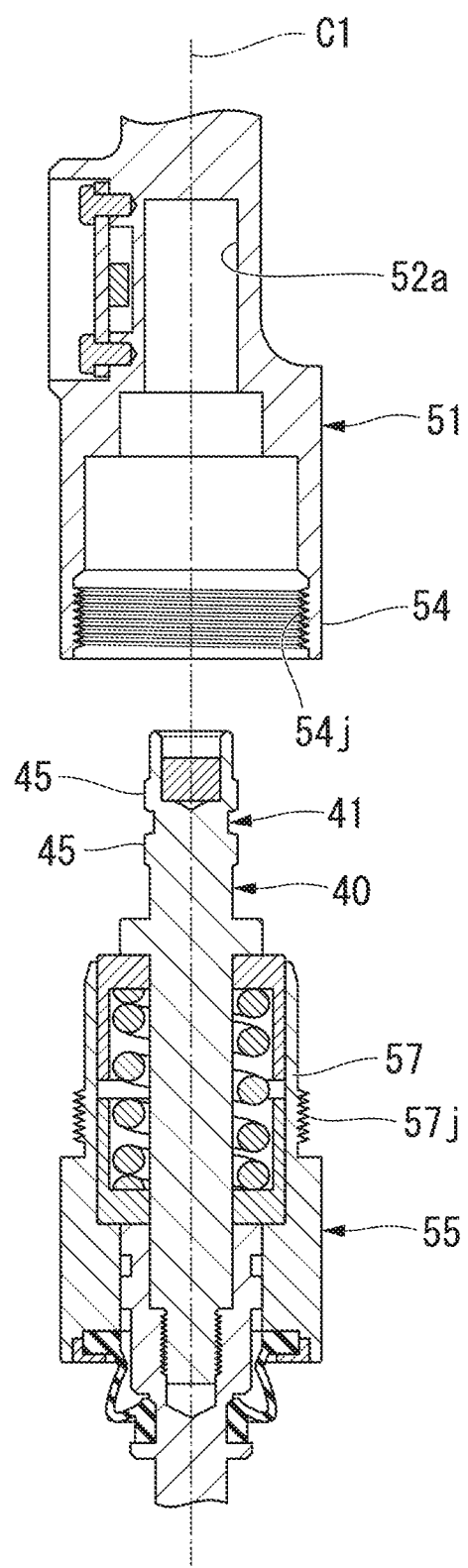
FIG. 13 is a view showing the housing before attachment following FIG. 12.

As shown in FIG. 13, next, the first housing half body 51 is connected to the second housing half body 55 that is attached to the shaft 40. Specifically, the second housing half body 55 that is attached to the shaft 40 is inserted into the first housing half body 51 from the upper end of the first shaft member 41, and screwing by the male screw part 57j of the connection part 57 and the female screw part 54j of the connected part 54 is performed.

At this time, the holding part-side slide part 45 that is provided on the upper end side of the first shaft member 41 comes into contact with and is fitted to the holding part-side inner wall 52a of the first housing half body 51, and thereby, the male screw part 57j of the connection part 57 can be screwed to the female screw part 54j of the connected part 54 without caring the attachment state at the fit position.

Accordingly, the stroke sensor 35 (refer to FIG. 3) according to the present embodiment is obtained.

The embodiment is not limited to connecting the first housing half body 51 to the second housing half body 55 that is attached to the shaft 40. The second housing half body 55 may be connected to the first housing half body 51 that is attached to the shaft 40. That is, even in this case, the holding part-side slide part 45 that is provided on the upper end side of the first shaft member 41 comes into contact with and is fitted to the holding part-side inner wall 52a of the first housing half body 51, and thereby, the male screw part 57j of the connection part 57 can be screwed to the female screw part 54j of the connected part 54 without caring the attachment state at the fit position.

As described above, the stroke sensor 35 according to the above embodiment includes a shaft 40 that extends in an axial line direction; a housing 50 that extends along the shaft 40, houses the shaft 40 in a state where the shaft 40 protrudes outside, and supports the shaft 40 slidably in the axial line direction; a detection part 70 that detects a slide amount of the shaft 40; and a cover 80 that covers a slide end 55*a* on a protrusion side of the shaft 40 in a slide region between the shaft 40 and the housing 50 while allowing a relative movement between the shaft 40 and the housing 50, wherein a flange surface 58 the extends radially outward from the slide end 55*a* is provided on the housing 50, an axial direction seal 81 that is in close contact with the flange surface 58 in the axial line direction is provided on the cover 80, and a fixation member 90 that presses the axial direction seal 81 to be in contact with the flange surface 58 is further provided.

According to the configuration, the flange surface 58 that extends radially outward from the slide end 55*a* is provided on the housing 50, the axial direction seal 81 that is in close contact with the flange surface 58 in the axial line direction is provided on the cover 80, and the fixation member 90 that presses the axial direction seal 81 to be in contact with the flange surface 58 is further provided. Thereby, the press contact force of the fixation member 90 causes the axial direction seal 81 to be in close contact with the flange surface 58, and therefore, it is possible to cause the axial direction seal 81 to be sufficiently close contact with the flange surface 58. That is, even when the housing 50 is expanded or the elastic force of the cover 80 is reduced due to the degradation of the cover 80, the sealing property between the axial direction seal 81 and the flange surface 58 depends on the press contact force of the fixation member 90, and therefore, it is possible to cause the axial direction seal 81 to be sufficiently close contact with the flange surface 58. Accordingly, it is possible to ensure the sealing property.

In the above embodiment, a radial direction seal 82 that is in close contact with the shaft 40 in a radial direction is provided on the cover 80. Thereby, it is possible to ensure the sealing property between the radial direction seal 82 and the shaft 40 in addition to ensuring the sealing property between the axial direction seal 81 and the flange surface 58. Accordingly, it is possible to reliably prevent water that flows on the shaft 40 or an outer wall of the housing 50 from entering the housing 50.

In the above embodiment, a protrusion wall 59 that protrudes outward in the axial line direction from an outer circumferential part of the flange surface 58 is provided on the housing 50, and the fixation member 90 has a bowl shape and includes a circumferential wall 91 that is fitted to the protrusion wall 59 and a bottom wall 92 that continues to the circumferential wall 91 and that presses the axial direction seal 81 to be in contact with the flange surface 58. Thereby, it is possible to ensure the sealing property between the axial direction seal 81 and the flange surface 58 by the press contact force of the bottom wall 92 while ensuring the sealing property between the circumferential wall 91 and the protrusion wall 59 by the fitting of the circumferential wall 91 to the protrusion wall 59.

In the above embodiment, an elastic protrusion part 81*a* that protrudes toward the flange surface 58 is provided on the axial direction seal 81. Thereby, the contact property between the axial direction seal 81 and the flange surface 58 is enhanced compared to a case where a surface on the flange surface 58 side of the axial direction seal 81 is a flat surface, and therefore, it is possible to improve the sealing property between the axial direction seal 81 and the flange surface 58.

In the above embodiment, a recess part 58*h* to which the elastic protrusion part 81*a* is fitted is provided on the flange surface 58. Thereby, even when water that flows on the shaft 40 or an outer wall of the housing 50 enters a space between the axial direction seal 81 and the flange surface 58, it is possible to stop the water to the recess part 58*h*. Accordingly, it is possible to reliably prevent the water from entering the housing 50. Further, it is possible to prevent the position displacement in the radial direction between the axial direction seal 81 and the flange surface 58, and therefore, it is possible to cause the press contact force of the fixation member 90 to act equally on the axial direction seal 81.

Accordingly, it is possible to improve the sealing property between the axial direction seal 81 and the flange surface 58.

In the above embodiment, the elastic protrusion part 81*a* has an annular shape so as to surround the slide end 55*a* when seen from the axial line direction. Thereby, even when water that flows on the shaft 40 or an outer wall of the housing 50 enters a space between the axial direction seal 81 and the flange surface 58 or the fixation member 90, the water flows along the outer circumference of the elastic protrusion part 81*a*, and therefore, it is possible to stop the water to a part on the outer circumference side of the elastic protrusion part 81*a*. Accordingly, it is possible to reliably prevent the water from entering the housing 50.

In the above embodiment, a rib 43 that protrudes radially outward so as to be in close contact with the cover 80 is provided on the shaft 40. Thereby, it is possible to block water that flows on the shaft 40 by the rib 43, and therefore, it is possible to reliably prevent the water that flows on the shaft 40 from entering the cover 80.

In the above embodiment, a bending/stretching part 83 that is capable of being bent and stretched when the shaft 40 is slid is provided on the cover 80. Thereby, the position of the cover 80 is not easily displaced when the shaft 40 is slid, and therefore, it is possible to ensure the sealing property further effectively.

In the above embodiment, the bending/stretching part 83 includes one folding part 83*a*. Thereby, it is possible to ensure a restoration force of the cover 80 to prevent the position displacement of the cover 80 with respect to the shaft 40, and therefore, it is possible to ensure the sealing property further effectively. In addition, the cover 80 has a simple shape compared to a case where the bending/stretching part 83 includes a plurality of folding parts 83*a*, and therefore, it is possible to improve the productivity of the cover 80.

In the above embodiment, the cover 80 includes an internal pressure adjusting part 84 that adjusts an internal pressure by expanding or shrinking such that a volume of a space 85 between the cover 80 and the shaft 40 is not changed when the bending/stretching part 83 is bent or stretched in accordance with sliding of the shaft 40. Thereby, even when the cover 80 is bent or stretched to be deformed when the shaft 40 is slid, it is possible to maintain the atmospheric pressure inside the cover 80 to a predetermined height, and therefore, it is possible to prevent suction of water into the cover 80. Accordingly, it is possible to improve the sealing property.

In the above embodiment, it is possible to ensure the sealing property in the motorcycle 1 that includes the above stroke sensor 35.

Second Embodiment

Figure 14:
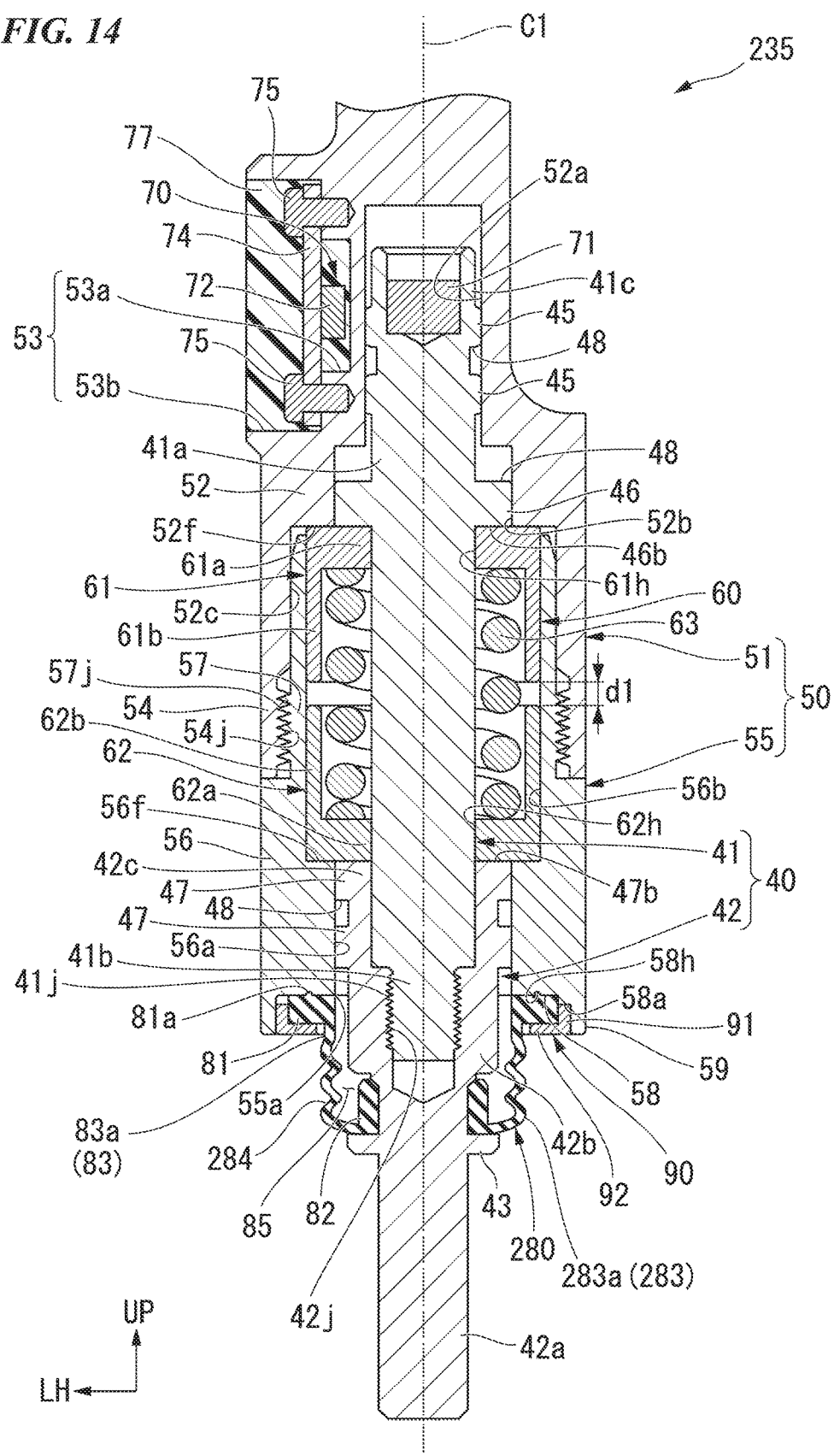
FIG. 14 is a cross-sectional view that corresponds to FIG. 2 of a stroke sensor according to a second embodiment.

FIG. 14 is a cross-sectional view that corresponds to FIG. 2 of a stroke sensor 235 according to a second embodiment.

As shown in FIG. 14, in the second embodiment, the configuration of a cover 280 is different from that of the first embodiment described above. In the following description, the same reference numerals are given to the same configuration as the first embodiment described above, and description of the same configuration is omitted.

<Cover>

Figure 15:
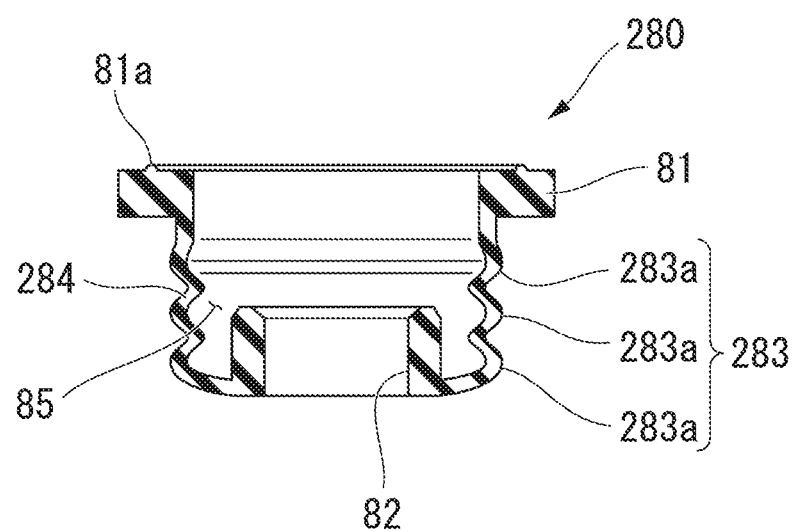
FIG. 15 is a view showing a cover according to the second embodiment.

As shown in FIG. 14 and FIG. 15, the cover 280 includes an axial direction seal 81 that is in close contact with the flange surface 58 in the axial line direction, a radial direction seal 82 that is in close contact with the second shaft member 42 of the shaft 40 in the radial direction, a bending/stretching part 283 that is provided between the axial direction seal 81 and the radial direction seal 82 and that is capable of being bent and stretched when the shaft 40 is slid, and an internal pressure adjusting part 284 that adjusts the pressure (internal pressure) in the cover 280.

The bending/stretching part 283 includes a plurality of folding parts 283a (for example, three in the present embodiment) that are aligned in the axial line direction.

The internal pressure adjusting part 284 extends downward from the inner end in the radial direction of the axial direction seal 81 while forming an accordion shape and is then bent inside in the radial direction to extend to arrive at the lower end of the radial direction seal 82.

As described above, in the above embodiment, the bending/stretching part 283 includes a plurality of folding parts 283a that are aligned in the axial line direction. Thereby, it is possible to cause the cover 280 to be bent or stretched at the plurality of folding parts 283a when the shaft 40 is slid to prevent the position displacement of the cover 280, and therefore, it is possible to ensure the sealing property further effectively.

The above embodiment is described using an example in which an elastic protrusion part that protrudes toward the flange surface is provided on the axial direction seal; however, the embodiment is not limited thereto. For example, an elastic protrusion part that protrudes toward the fixation member may be provided on the axial direction seal. Alternatively, an elastic protrusion part that protrudes toward both the flange surface and the fixation member may be provided on the axial direction seal. Alternatively, no elastic protrusion part may be provided on the axial direction seal.

The above embodiment is described using an example in which a recess part to which the elastic protrusion part is fitted is provided on the flange surface; however, the embodiment is not limited thereto. For example, a recess part to which the elastic protrusion part is fitted may be provided on the fixation member. Alternatively, a recess part to which the elastic protrusion part is fitted may be provided on both the flange surface and the fixation member. Alternatively, no recess part may be provided on the flange surface and the fixation member.

The above embodiment is described using an example in which the extended diameter part 46 is close to an inner wall of the housing 50 while keeping a slight gap without coming into contact with the inner wall of the housing 50 (without sliding); however, the embodiment is not limited thereto. For example, the extended diameter part 46 may be in contact with the inner wall of the housing 50 so as to slide. According to the configuration, the diameter part 46 in addition to the slide parts 45, 47 also slides, and the slide position is increased. Thereby, the position displacement between the detected body 71 and the detection body 72 does not easily occur, and therefore, it is possible to further reliably maintain further high detection accuracy.

The present invention is not limited to the above embodiment. For example, the shift speed change means is not limited to a shift pedal and may be a shift actuator (motor).

The saddle riding type vehicle includes all vehicles on which a driver rides so as to straddle the vehicle body. The saddle riding type vehicle includes not only a motorcycle (including a motorized bicycle and a scooter-type vehicle) but also a three-wheeled vehicle (including a vehicle having two front wheels and one rear wheel in addition to a vehicle having one front wheel and two rear wheels) or a four-wheeled vehicle.

The configuration in the embodiments described above is an example of the invention, and various changes such as substitution of the configuration element of the embodiments by a known configuration element can be made without departing from the scope of the invention.

The invention claimed is:

1. A stroke sensor comprising:
a shaft that extends in a direction along an axial line;
a housing that extends along the shaft, houses the shaft in a state where the shaft protrudes outside, and supports the shaft slidably in the direction along the axial line;
a detection part that detects a slide amount of the shaft; and
a cover that covers a slide end on a protrusion side of the shaft in a slide region between the shaft and the housing while allowing a relative movement between the shaft and the housing, wherein
a flange surface that extends radially outward from the slide end is provided on the housing,
an axial direction seal that is in close contact with the flange surface in the direction along the axial line is provided on the cover,
a fixation member that presses the axial direction seal to be in contact with the flange surface is further provided,
a protrusion wall that protrudes outward in the direction along the axial line from an outer circumferential part of the flange surface is provided on the housing, and
the fixation member has a bowl shape and includes a circumferential wall that is fitted to the protrusion wall and a bottom wall that continues to the circumferential wall and that presses the axial direction seal to be in contact with the flange surface.

2. The stroke sensor according to claim 1, wherein a radial direction seal that is in close contact with the shaft in a radial direction is provided on the cover.

3. The stroke sensor according to claim 1, wherein an elastic protrusion part that protrudes toward the flange surface or the fixation member is provided on the axial direction seal.

4. The stroke sensor according to claim 3, wherein a recess part to which the elastic protrusion part is fitted is provided on the flange surface or the fixation member.

5. The stroke sensor according to claim 3, wherein the elastic protrusion part has an annular shape so as to surround the slide end when seen from the direction along the axial line.

6. The stroke sensor according to claim 1, wherein a rib that protrudes radially outward so as to be in close contact with the cover is provided on the shaft.

7. The stroke sensor according to claim 1, wherein a bending/stretching part that is capable of being bent and stretched when the shaft is slid is provided on the cover.

8. The stroke sensor according to claim 7, wherein the bending/stretching part includes one folding part.

9. The stroke sensor according to claim 7, wherein the bending/stretching part includes a plurality of folding parts that are aligned in the direction along the axial line.

10. The stroke sensor according to claim 7, wherein the cover includes an internal pressure adjusting part that adjusts an internal pressure by expanding or shrinking such that a volume of a space between the cover and the shaft is not changed when the bending/stretching part is bent or stretched in accordance with sliding of the shaft.

11. A saddle riding type vehicle comprising a stroke sensor according to claim 1.

* * * * *